Feb. 16, 1954  B. B. BRESLOW  2,669,471
HUB TO SHAFT CONNECTION
Filed June 1, 1948
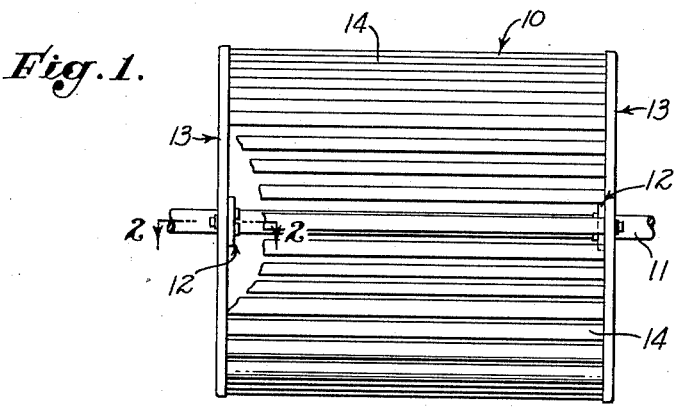
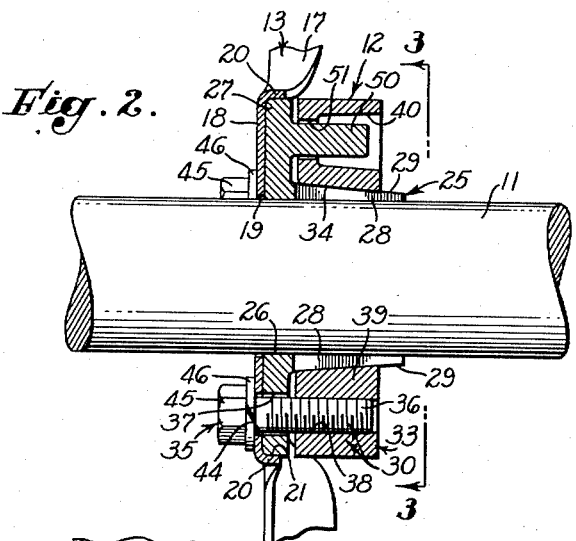
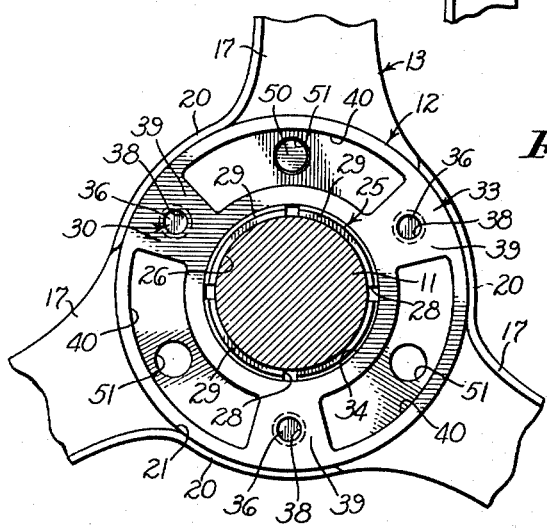
INVENTOR.
BEN B. BRESLOW
BY HIS ATTORNEYS.
HARRIS, KIECH, FOSTER & HARRIS

UNITED STATES PATENT OFFICE 2,669,471

HUB TO SHAFT CONNECTION

Ben B. Breslow, Los Angeles, Calif., assignor to Utility Appliance Corp., Los Angeles, Calif., a corporation of California Application June 1, 1948, Serial No. 30,333

3 Claims. (Cl. 287—52.06)

My invention relates in general to hubs for mounting rotatable members on shafts and, since the fundamental principles involved are particularly applicable to and were originally embodied in a hub for fans, I prefer to consider such an application of the invention herein for convenience in disclosing same. However, it will be understood that the invention may be practiced in connection with rotatable members other than fans without departing from the spirit of the invention.

A primary object of the invention is to provide a hub which is adapted to be clamped on a shaft without the use of keys, set screws, or any other means which necessitates machining of the shaft, or which may result in marring of the shaft.

Employing a hub which is merely clamped on a shaft has a number of important advantages. For example, expensive machining operations on the hub and the shaft, such as forming keyways therein, for example, are eliminated. Also, mounting of the hub on the shaft during assembly is facilitated, as compared to a construction which utilizes a key, since there is no necessity for aligning the keyways in the hub and the shaft. Another advantage in this connection resides in the fact that the hub of the present invention may be clamped on a shaft in the precise position required. In a construction which utilizes a key, on the other hand, it is difficult to position the hub on the shaft accurately since driving the key frequently results in axial displacement of the hub relative to the shaft.

Another, and important, advantage of the present invention is that, if it is necessary to move the hub axially of the shaft for any reason, the portion of the shaft exposed by axial movement of the hub remains intact and is not marred by keyways or set screw marks, for example. Thus, the position of the shaft with respect to bearings in which it may be journalled may be varied without any danger of placing keyways, set screw marks, or the like, inside the bearings, which is an important feature of the invention.

Another object of the invention is to provide a hub having the foregoing advantages which includes a member that is adapted to be contracted into positive frictional engagement with a shaft, and which includes clamping means for contracting said member.

More specifically, an object of the invention is to provide a hub wherein the aforesaid contractible member is tapered, and wherein the clamping means includes a clamping member having a tapered bore therein which is adapted to receive the tapered, or contractible member, the clamping means also including means for forcing the clamping member onto the tapered member so as to contract the latter into engagement with the shaft to lock the hub on the shaft. Another object in this connection is to provide a hub wherein the means for forcing the clamping member onto the tapered member comprises a plurality of threaded fastening elements, such as bolts, screws, or the like, which extend axially through openings in one of the aforesaid members and which are threaded into tapped holes in the other member, the bolts or other fastening elements being adapted to draw the clamping member onto the tapered member so as to contract the latter into locked engagement with the shaft.

An important object of the present invention is to provide a hub which is adapted to be connected to the fan or other rotatable member with which it is to be used by the bolts or other fastening elements for drawing the clamping member onto the tapered, contractible member. This construction greatly facilitates assembly of the fan, hub and shaft since it permits connecting the fan to the hub and mounting the hub on the shaft in a single operation, which is an important feature of the invention.

Another important advantage of the present invention is that it permits the use of a hub which is separate from the fan or other rotatable member with which it is used so that different operations may be performed on the hub and the fan during the fabrication thereof. For example, the fan may be formed of a material which requires painting whereas the hub itself may not require painting. Thus, the fan may be painted prior to assembly with the hub, which is an important feature of the invention, particularly where the fan is painted by spraying, since accumulations of paint in the bore in the hub are avoided so that the hub may be mounted on a shaft readily without interference by such paint accumulations.

Another object of the invention is to provide a construction wherein one of the members of the hub is provided with a locating element, such as a pin, which is insertable into a locating hole in the other member during assembly of the hub to align the openings for the bolts or other fastening elements. An important object in this connection is to provide a construction wherein the locating pin and the locating hole therefor are larger than the openings for the fastening elements so that the locating pin cannot be inserted into one of the openings for the fastening elements inadvertently.

The foregoing objects and advantages of my invention, together with other objects and advantages which will become evident, may be attained through the utilization of the exemplary embodiment of the invention which is illustrated in the accompanying drawing and which is described in detail hereinafter. Referring to the drawing:

Fig. 1 is a side elevational view on a reduced scale showing a fan assembly which includes the hub of the invention;

Fig. 2 is a fragmentary sectional view taken along the broken line 2—2 of Fig. 1 and showing the hub in detail; and Fig. 3 is a view taken along the broken line 3—3 of Fig. 2 in the direction of the arrows intersecting said line.

Referring particularly to Fig. 1 of the drawing, I show a fan 10 with which the hub of the invention may be employed particularly advantageously for mounting the fan on a shaft 11, a pair of my hubs, each indicated generally by the numeral 12, being employed with the particular fan illustrated. It will be understood, however, that my hub 12 is not limited to use with fans such as the fan 10, but may be used with fans of other types, or may be used with other rotatable members, without departing from the spirit of the invention.

Continuing to refer particularly to Fig. 1 of the drawing, the fan 10, in the particular construction illustrated, includes a pair of end members 13 which are connected to the respective hubs 12 in a manner to be described, and which carry a plurality of axially extending, circumferentially spaced blades or vanes 14. As best shown in Figs. 2 and 3 of the drawings, each end member 13 includes a plurality of radial spokes 17 which terminate at their inner ends in a disc-like central portion or hub portion 18. Each hub portion 18 is provided with a central opening 19 therethrough for the shaft 11, and is provided with axially extending, peripheral portions 20 which cooperate to define a cup-like recess 21, the recesses 21 of the respective hub portions 18 being adapted to receive the corresponding hubs 12 therein, as best indicated in Fig. 2 of the drawing.

The two hubs 12 associated with the fan 10 are of identical construction so that only one of them will be considered in detail, one of the hubs 12 being shown in detail in Figs. 2 and 3 of the drawing. Referring to Figs. 2 and 3, the hub 12 illustrated therein includes a tapered member 25 having a bore 26 therethrough for reception of the shaft 11, and having an annular flange 27 thereon which is adapted to telescope into the cup-like recess 21 of the hub portion 18 of the corresponding end member 13. As best shown in Fig. 3 of the drawing, the tapered member 25 is provided with a plurality of axially extending, radial slots 28 which communicate with the bore 26 to provide circumferentially spaced, shaft-engaging elements or fingers 29, the latter being movable inwardly toward each other into frictional engagement with the shaft 11 by a clamping means 30 so as to lock the hub 12 on the shaft. In effect, the slots 28 in the tapered member 25 provide a contractible member which is adapted to be contracted into engagement with the shaft 11 by the clamping means 30, the member 25 being formed of a resilient material so that it will expand to release the shaft when it is released by the clamping means.

The clamping means 30 includes an annular clamping member or collar 33 having a tapered bore 34 therein which is adapted to receive the tapered member 25, and also includes means indicated generally by the numeral 35 for drawing the clamping member 33 onto the tapered member to contract the latter into engagement with the shaft 11 by bending the fingers 29 thereof inwardly toward each other. As best shown in Fig. 2 of the drawing, the means 35 for drawing the clamping member 33 onto the tapered member 25 includes a plurality of threaded, bolt-like fastening elements 36 which may be bolts, screws or the like and which are exemplified as bolts for purposes of illustration. The bolts 36 extend through openings 37 in the flange 27 of the tapered member 25 and are threaded into tapped holes 38 in the clamping member 33, the holes 38 being formed in circumferentially spaced rib portions 39 of the clamping member which are separated by arcuate recesses 40 therein.

It will be apparent that as the bolts 36 are threaded into the holes 38 in the clamping member 33, the clamping member is drawn onto the tapered member 25 to contact the latter into frictional engagement with the shaft 11 by bending the fingers 29 inwardly into engagement with the shaft. It will be apparent that the bolts 36 may be tightened to varying degrees so as to vary the clamping force obtaining between the shaft 11 and the tapered member 25. In this way, the clamping force may be adjusted to withstand any force which would tend to displace the tapered member 25 with respect to the shaft 11, or vice versa.

As best shown in Fig. 2 of the drawing, the bolts 36 for drawing the clamping member 33 onto the tapered member 25 extend into the openings 37 in the tapered member through registering openings 44 in the hub portion 18 of the corresponding end member 13, the bolts 36 being provided with heads 45 which are adapted to seat against the hub portion 18. Preferably, lock washers 46 are interposed between the heads 45 of the bolts and hub portion 18 as is well known in the art. It will be apparent that with this construction, the bolts 36, in addition to performing the function of drawing the clamping member 33 onto the tapered member 25 to contract the latter into engagement with the shaft 11, perform the additional function of connecting one of the end members 13 of the fan 10 to the hub 12. Thus, one of the end members 13 may be connected to the corresponding hub 12 and the clamping member 33 of the hub may be drawn onto the tapered member 25 thereof to contract the latter into engagement with the shaft 11 all in a single operation, which is an important feature of the present invention.

It will be noted that since the flange 27 of the tapered member 25 telescopes into the cup-like recess 21 in the hub portion 18 as previously discussed, the tapered member tends to retain the corresponding end member 13 during assembly, which is another feature of the invention.

In order to further facilitate assembly of the components of my hub 12, I provide one of the members forming the hub, e. g., the tapered member 25, with a locating element, exemplified as a pin 50, which is insertable into one of a plurality of locating holes 51 in the clamping member 33 for the purpose of aligning the openings 37 in the tapered member with the holes 38 in the clamping member. In the particular construction illustrated, the locating pin 50 is carried by the flange 27 of the tapered member 25 and the locating holes 51 communicate with the arcuate recesses 40 in the clamping member 33. It will be noted that with this construction, the locating pin 50 is always disposed in one of the arcuate recesses 40 and does not project from the hub so that it is not in the way at any time, which is another feature of the invention.

Another important feature of the present invention resides in the provision of a locating pin 50 which is larger than the holes 38 in the clamping member 33 so that the locating pin cannot be inserted into one of the holes 38 inadvertently. It will be apparent that this feature greatly facilitates assembly of the components of my hub since it eliminates any necessity for withdrawing the locating pin from one of the holes 38 and re-orienting the tapered member 25 and the clamping member 33, which might occur frequently if the locating pin were smaller than the holes 38.

If it is necessary to remove the hub 12 from the shaft 11 for any reason, or to shift the hub axially or circumferentially of the shaft, this may be accomplished readily by loosening the bolts 36 and then tapping on the heads of the bolts so as to force the clamping member 33 off the tapered member 25. Subsequently, the position of the tapered member 25 on the shaft 11 may be changed readily, or it may be removed from the shaft completely if desired.

As previously indicated, my hub construction has a number of important advantages over hubs which employ keys, set screws, or other means of affixation to shafts, one of these being the elimination, or substantial elimination, of expensive machining operations. Preferably, the components of the hubs 12 are formed by a die casting or similar process so that the only machining necessary is tapping the holes 38 for the bolts 36. Since the hubs 12 are merely clamped on the shaft, no machining of the shaft is necessary, this being particularly advantageous when a pair of the hubs 12 are used in connection with a rotatable member such as the fan 10 since there is no necessity for milling two properly oriented keyways in a single shaft, which is a difficult operation. Also, the problem of aligning keyways in shafts and hubs is eliminated with my hub construction, as is the problem of preventing axial movement of the hubs in driving keys. The latter is particularly important where a predetermined axial spacing between two hubs must be maintained, as in the case of the fan 10.

Another advantage of my hub construction is that by eliminating the use of keys, set screws, or the like, any portion of the shaft may be used as a bearing surface at any time so that the shaft may be shifted with respect to bearings in which it is journalled without any danger of placing keyways, set screw marks, etc., inside the bearings.

Another important advantage of the present invention resides in the provision of hubs 12 which are separate from the rotatable members which they support, and resides in the employment of the bolts 36 for connecting such members to the hubs as well as for clamping the hubs on a shaft. This feature permits assembling the hubs and the members to be carried thereby and mounting the hubs on shafts in a single operation. Also, since, with my hub construction, the hubs and the members to be carried thereby are formed separately, different operations may be performed on the various parts of the final assembly during fabrication thereof. For example, considering the particular assembly illustrated in the drawing, the usual practice is to paint the fan 10, prior to mounting it on the shaft 11, by a spraying operation. Since the hubs 12 are formed separately and are assembled with the fan 10 as the latter is mounted on the shaft 11, painting the hubs may be avoided. This is advantageous since it avoids paint accumulations in the bores 26 which might interfere with mounting the hubs on the shaft.

Although I have disclosed an exemplary embodiment of my invention herein for purposes of illustration, it will be understood that various changes, modifications and substitutions may be incorporated therein without necessarily departing from the spirit of the invention, and I hereby reserve the right to all such changes, modifications and substitutions as properly come within the scope of the appended claims.

I claim as my invention:

1. In combination: a rotatable member provided with a cup-shaped recess therein; a tapered, contractible hub member having a bore therein for the reception of a shaft, said tapered hub member being contractible into frictional engagement with the shaft; a clamping hub member having a tapered bore therein which is adapted to receive said tapered hub member, one of said hub members having a portion which is of substantially the same diameter as said recess and which is adapted to be telescoped into said recess to position said rotatable member relative to said hub members; and means connecting said rotatable member, said tapered hub member and said clamping hub member together for drawing said clamping hub member onto said tapered hub member to contract the latter into engagement with the shaft.

2. A combination as set forth in claim 1 wherein one of said members is provided with a plurality of threaded holes therein and wherein the others of said members are provided with a plurality of openings therein which register with said threaded holes, the means last mentioned in claim 1 comprising a plurality of threaded fastening elements which extend through said openings and which are threaded into said threaded holes.

3. In a hub construction, a rotatable member and first and second hub members, one of said hub members having an annular flange and said rotatable member having a cup-shaped recess of substantially the same diameter as said flange for telescopically receiving said flange, said first hub member having a tapered, contractible portion which is provided with a bore therein for the reception of a shaft and which is adapted to be contracted into frictional engagement with the shaft, and said second hub member having a tapered bore therein which is adapted to receive said tapered, contractible portion, said hub construction including means for connecting said rotatable member and said hub members together and for forcing said second hub member onto said tapered, contractible portion to contract the latter into engagement with the shaft.

BEN B. BRESLOW.

(References on following page)

References Cited in the file of this patent

UNITED STATES PATENTS

| Number | Name | Date |
|---|---|---|
| 98,144 | Buckman | Dec. 21, 1869 |
| 726,378 | Tucker | Apr. 28, 1903 |
| 965,187 | Hopkins | July 26, 1910 |
| 1,107,607 | Hallowell | Aug. 18, 1914 |
| 1,139,120 | Hoffman | May 11, 1915 |
| 1,292,242 | Brophy | Jan. 21, 1919 |
| 1,365,896 | Duffy | Jan. 18, 1921 |
| 1,371,212 | Adams et al. | Mar. 15, 1921 |
| 1,378,091 | Carlsen | May 17, 1921 |
| 1,395,913 | Ford | Nov. 1, 1921 |
| 1,422,598 | Misenheimer | July 11, 1922 |
| 1,831,833 | Wright | Nov. 17, 1931 |
| 2,270,583 | Forton | Jan. 20, 1942 |
| 2,396,414 | Firth | Mar. 12, 1946 |
| 2,407,032 | Myers | Sept. 3, 1946 |
| 2,435,764 | Wessel | Feb. 10, 1948 |
| 2,441,467 | Browning | May 11, 1948 |
| 2,517,391 | Ernestus | Aug. 1, 1950 |

FOREIGN PATENTS

| Number | Country | Date |
|---|---|---|
| 341,215 | Great Britain | of 1931 |
| 512,568 | Great Britain | Sept. 20, 1939 |